United States Patent [19]
Steinthal et al.

[11] Patent Number: 6,023,069
[45] Date of Patent: *Feb. 8, 2000

[54] SEMI-CONSTANT POWER CIRCUIT FOR USE WITH A THERMAL RADIATION SOURCE

[75] Inventors: Gregory Steinthal; Andrian Kouznetsov, both of Santa Barbara, Calif.

[73] Assignee: Engelhard Sensor Technologies, Inc., Iselin, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/959,750

[22] Filed: Oct. 28, 1997

[51] Int. Cl.$^7$ ...................................................... H01K 1/02
[52] U.S. Cl. ................................... 250/493.1; 250/495.1; 250/504 R
[58] Field of Search ............................... 250/493.1, 494.1, 250/495.1, 504 R

[56] References Cited

U.S. PATENT DOCUMENTS 4,839,566 6/1989 Herold et al. .......................... 250/493.1
4,954,718 9/1990 Mattheissen .......................... 250/493.1

*Primary Examiner*—Kiet T. Nguyen
*Attorney, Agent, or Firm*—Lyon & Lyon LLP

[57] ABSTRACT

A power circuit for use with a resistive thermal radiation source in which the power delivered to the resistive thermal radiation source will remain constant within a preselected deviation over a fixed period of time as the source resistance of the source varies between an initial source resistance and a second source resistance at the operating temperature. The power circuit is designed to maintain constant power within a preselected deviation by using the resistance of the resistive thermal radiation source to calculate a preselected resistance used in the power circuit according to the following equation:

$$\frac{\Delta P}{P_{si}} = \frac{(K_1^2 - K_2) \times (1 - K_2)}{(K_1 + K_2)^2}$$

wherein $\Delta P = P_{si} - P_s$; $P_{si}$ = the initial power on the resistive thermal radiation source; $P_s$ = the power on the resistive thermal radiation source when the source resistance is equal to the second source resistance; $K_1 = RO/R_{si}$; $R0$ = the preselected resistance; $R_{si}$ = the initial source resistance; $K_2 = R_s/R_{si}$; and $R_s$ = the second source resistance.

18 Claims, 2 Drawing Sheets

SEMI-CONSTANT POWER CIRCUIT FOR USE WITH A THERMAL RADIATION SOURCE

FIELD OF THE INVENTION

The present invention is in the field of power circuits for use with a thermal radiation source. The present invention is especially useful in Non-Dispersive Infrared ("NDIR") gas analyzers.

BACKGROUND OF THE INVENTION

NDIR gas analysis measures the concentration of a gas in a sample by determining the amount of absorption of light which occurs at wavelengths which are normally selected to coincide with a relatively strong absorption band that is characteristic of the gas to be measured. In its simplest form, an NDIR gas analyzer contains a radiation source, an optical interference filter, a sample chamber, a detector and associated electronics. In operation, light is emitted from the radiation source and passed through the sample chamber where a portion of the light is absorbed by a sample gas. Next, light is passed through the filter to remove undesired wavelengths of light and then the remaining filtered light is passed on to the detector which measures the strength of the filtered light. Finally, the associated electronics calculate the concentration of the gas being measured in the sample cell.

The theory of NDIR gas analysis is well established. It has long been considered one of the best methods for gas measurement. However, it is not suitable for many uses because of its complicated and expensive implementation. Over the years, various improvements have been made to simplify NDIR gas analyzers in order to reduce the cost of such devices. Examples of some improvements are set forth in U.S. Pat. Nos. 5,163,332, 5,222,389 and 5,340,986. While such improvements have advanced the state of the art of NDIR gas analyzers, there are still many applications in which NDIR gas analyzers cannot be used when low cost is an integral design constraint.

All known NDIR gas analyzers require an IR source and an IR detector pair in some form, fit and function. Even when low cost is an integral design constraint, other design constraints must also be met. Such constraints include reliability, durability, stability, long life, low power and high efficiency. An incandescent miniature light bulb utilized as an IR source meets many of these design constraints, although there are other types of resistive thermal radiation sources which can also be used as IR sources in NDIR gas analyzers, such as platinum resistive sources and NiCr filament based sources. In all such sources, the particles of light are emitted from the surface of the source due to increased temperature of the source which is achieved by passing electrical current through the electrically resistive body of the source. The intensity and spectral content of light is controlled by the temperature of the surface of the source, which is controlled by controlling the amount of electical power applied to the source.

An incandescent miniature light bulb is typically composed of a tungsten filament vacuum sealed within a glass envelope to prevent oxidation which would severely cut the life time of the tungsten filament. In operation, the light bulb is coupled to a power source in an electrical circuit. As an electrical current is passed through the bulb, the bulb will give off light. The tungsten filament in of itself is an electrically resistive material, and the bulb has an initial resistance which can be measured. However, over time, the resistance of the bulb can vary. As the resistance of the IR source changes over time, the amount of electrical power delivered to the source will not be constant in the case when a simple contant current or a constant voltage source is used to drive the bulb, and therefore the lamp temperature will change over time. Absent correction for such changes, an NDIR gas analyzer using such an IR source will lose its calibration over time. Some prior art IR sensor designs include an optical reference channel to compensate for changes in lamp brightness aging affects, with or without a true constant power source driver. Various software algorithms have also been developed to compensate for aging. However, these solutions are complicated and utilize feedback loops that might become unstable.

Accordingly, a need exists for an inexpensive improved power circuit for use with a resistive thermal radiation source which will remain stable over time. In addition, there is also a need for further improvements which will reduce the cost of NDIR gas analyzers and thereby increase the applications in which such devices can be used.

SUMMARY OF THE INVENTION

The present invention is generally directed to an improved power circuit for use with a resistive thermal radiation source in which the power delivered to the resistive thermal radiation source will not vary by more than a preselected amount over a fixed period of time. The power circuit is designed to maintain constant power within a preselected deviation by using the resistance of the resistive thermal radiation source to calculate a preselected resistance used in the power circuit according to the following equation:

$$\frac{\Delta P}{P_{si}} = \frac{(K_1^2 - K_2) \times (1 - K_2)}{(K_1 + K_2)^2}$$

wherein $\Delta P = P_{si} - P_s$; $P_{si}$=the initial power on the resistive thermal radiation source; $P_s$=the power on the resistive thermal radiation source when the source resistance is equal to the second source resistance; $K_1 = R_0/R_{si}$; $R_0$=the preselected resistance; $R_{si}$=the initial source resistance; $K_2 = R_s R_{si}$; and $R_s$=the second source resistance.

In a first, separate aspect of the present invention, an improved power circuit is disclosed in which an element with a preselected resistance is coupled between a voltage source and the resistive thermal radiation source which is coupled to a ground. In this circuit, the preselected resistance is selected to be within a chosen variation from the initial source resistance so that the power delivered to the resistive thermal radiation source will not vary by more than a preselected amount over a fixed period of time as the source resistance varies between the initial source resistance and a second source resistance at the operating temperature.

In another, separate aspect of the present invention, an improved power circuit is disclosed in which a constant power driver is provided with a programmable impedance which is programmed by use of an element with a preselected resistance which is within a chosen variation from the initial source resistance so that the power delivered to the resistive thermal radiation source will remain constant within a preselected deviation over a fixed period of time as the source resistance varies between the initial source resistance and a second source resistance at the operating temperature. The programmable impedance may be provided by a programmable impedance circuit having a ground, an element with a preselected resistance coupled to the ground and an amplifier with a preselected gain with one input coupled to the constant power driver, a second input coupled to the element with the preselected resistance and a first end of the resistive thermal radiation source, and an output connected to a second end of the resistive thermal radiation. Such a circuit is particularly well suited for use in low cost NDIR gas sensors designed for portable, low power applications, where it is desirable to consume less power and require less voltage.

Accordingly, it is a primary object of the present invention to provide an improved power circuit for use with a resistive thermal radiation source.

This and further objects and advantages will be apparent to those skilled in the art in connection with the drawings and the detailed description of the preferred embodiments set forth below.

DETAILED DESCRIPTION OF THE PREFERRED EMBODIMENTS

Figure 1:
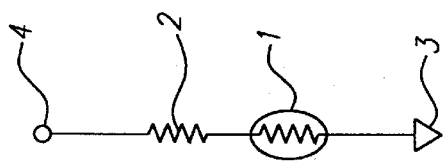
FIG. 1 is a functional outline of the low power circuit of a first preferred embodiment.

In the preferred embodiment of the present invention shown in FIG. 1, a resistive thermal radiation source 1 with an initial source resistance $R_{si}$ is coupled to a ground 3 and an element 2 with a preselected resistance $R_0$ which is also coupled to a voltage source 4. In an especially preferred embodiment, the resistive thermal radiation source 1 is an incandescent miniature light bulb whereas the second element 2 can be one or more resistors, or other electrical components, as long as there is a passive resistance across all of the components which make up the element 2 that is equal to the preselected resistance $R_0$. The preselected resistance $R_0$ is selected to be within a chosen variation from the initial source resistance $R_{si}$ so that the power delivered to the bulb 1 will remain constant within a preselected deviation over a fixed period of time as the resistance of the radiation source 1 varies between its initial resistance $R_{si}$ and a second resistance $R_s$. In its simplest and preferred form, the preselected resistance $R_0$ is selected to be the same as the initial source resistance $R_{si}$. While it may theoretically be preferred that $R_0$ is equal to $R_{si}$ in a preferred embodiment, this is not always possible to do in actuality. For instance, the value of $R_{si}$ may not be known exactly. Also, it may not, as a practical matter, be possible to exactly match $R_0$ to $R_{si}$ in operation. Accordingly, even where it is desired that $R_0$ should equal $R_{si}$, the results may be only be approximate. Thus, if $R_0$ is within a deviation of 1% from $R_{si}$, it may be deemed to be approximately equal to $R_{si}$ to accomodate the differences between theoretical results and results which are attainable in practice.

The circuit shown functionally in FIG. 1 is particularly well suited for use in a low cost NDIR gas analyzer and does not require any feedback. It is not a "true" constant power circuit in which the voltage across or current through the source is measured and then corrected. Instead, it matches the electrical resistance of the source and provides constant power over a limited range that is acceptable and practical for IR incandescent sources. Recalling Ohm's Law: V=I*R and the fact that P (Power)=V*I where V is voltage in volts and I is current in amps, one can solve for the change in power and find where it is minimized. That is solve for the power delivered to the IR source, take the first derivative and set it equal to zero:

1) Solve for I:

$$I = V_0/(R_0 = R_{si}) \quad {}^1\text{Ohms Law}$$

2) Solve for $P_{si}$:

$$P_{si} = I^{2*}R_{si} = (R_0 + R_{si}))^{2*}R_{si}$$

3) Take $1^{st}$ Derivative:

$$dP_{si} = 2*(V_0/(R_0+R_{si})^2 *R_0)*dV_0 + V_0^2(R_0+R_{si})^{-2} dR_0 +$$
$$V_0^2 * R_0^2 *(R_0+R_{si})^{-3} * dR_0$$
$$= 2*(V_0*R_0/(R_0+R_{si})^2)*dV_0 + (V_0^2 * dR_0)/$$
$$(R_0+R_{si})^2 *(1-2*R_0/(R_0+R_{si})$$
$$= 2*(V_0*R_0/(R_0+R_{si})^2)*dV_0 + (V_0^2*dR_0)/(R_0+R_{si})^2 *$$
$$[R_0+R_{si}-2*R_0)/(R_0+RR_{si})]$$
$$= (V_0^2/R_0+R_{si})*R_0/(R_0+R_{si})*[2*dV_0/V_0 + (R_{si}-R_0)/$$
$$(R_0+R_{si})*dR_0/R_0$$
$$= R_{si}*[2*dV_0/V_0+(R_{si}-R_0)/(R_0+R_{si})*dR_0/R_0]$$

From this we find that if we let d $P_{si}=0$, this is only true $R_{si}=R_0$ assuming $V_0$ does not change. Thus in the real world $R_0$ equals the resistance of the IR source at its operating temperature. If, for example, we know the lamp resistance at its operating temperature equals $50\Omega$, let $R_0=50\Omega$ and let $V_0$ =10 Volts. Utilizing equation 2 above defining power delivered to the IR source we find that as the resistance of the lamp changes +/−10% of its original value, the electrical power delivered to the load remains essentially constant (less than $10^{-3}$ error). Based upon measurements taken under normal operating conditions, it has been found that the lamp resistance will not vary much more than +/−10% of its original value.

Using the foregoing, it is possible to design a circuit which will deliver power that is constant within a preselected deviation over a fixed period of time as the resistance of the source varies over time. It is also possible to determine the amount of power variation which will occur as the resistance of the source changes over time if $R_0$ is not selected to match $R_{si}$ through use of the following equation, which will hereinafter be referred to as EQUATION 1:

$$\frac{\Delta P}{P_{si}} = \frac{(K_1^2 - K_2) \times (1 - K_2)}{(K_1 + K_2)^2}$$

wherein $\Delta P=P_{si}-P_s$; $P_{si}$=the initial power on the resistive thermal radiation source; $P_s$=the power on the resistive thermal radiation source when the source resistance is equal to the second source resistance; $K_1=R_0/R_{si}$; $R_0$=the preselected resistance; $R_{si}$=the initial source resistance; $K_2=R_s/R_{si}$; and $R_s$=the second source resistance.

Figure 2:
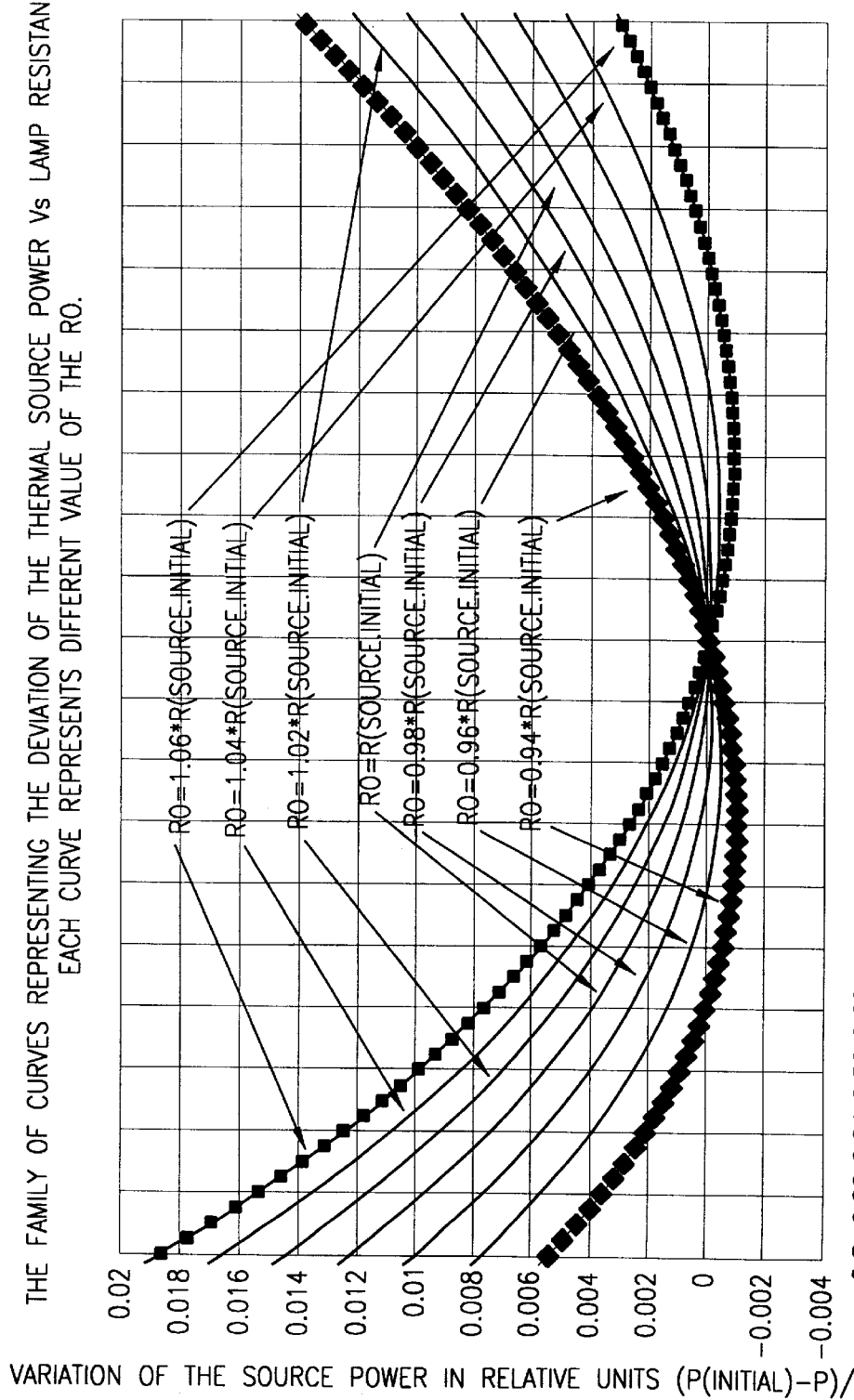
FIG. 2 is a graph showing a family of curves representing the deviation of the thermal power source versus lamp resistance for different values of resistance of a second element used in a circuit of a preferred embodiment.

FIG. 2 illustrates the affect of varying the resistance of the preselected resistance relative to the initial resistance of the resistive thermal radiation source. Each curve was calculated for a different value of $R_0$. The deviation of power is relative to initial power and the deviation of the source resistance is relative to initial source resistance so that all values in FIG. 2 are presented in relative units. The Y axis represents $\Delta P/P_{si}$ and the X axis represents $R_s/R_{si}$. Using FIG. 2, it is possible to see how the preselected resistance can be varied from the initial source resistance while the power delivered to the source will remain constant within a preselected deviation over a fixed period of time as the source resistance varies over time.

Although the circuit of the first preferred embodiment is very simple, and therefore highly efficient to construct, it requires a voltage twice as high as the voltage on the lamp 1 because the voltage drop on element 2 will be the same as the voltage drop on the lamp 1. In addition, the circuit shown in FIG. 1 will also consume twice as much power as the lamp 1 itself. Accordingly, such an approach may not be suitable for certain portable, low power applications.

In an alternate preferred embodiment, suitable for low power applications, a constant power driver with a programmable output impedance is coupled to the resistive thermal radiation source and the output impedance of the constant power driver is programmed to be within a chosen amount of variation from the initial source resistance of the resistive thermal radiation source at its operating temperature. Instead of using passive resistance, this alternative embodiment uses an active circuit which will act in the same way as a resistor used as element 2 in FIG. 1, but consume less power and require less voltage.

Figure 3:
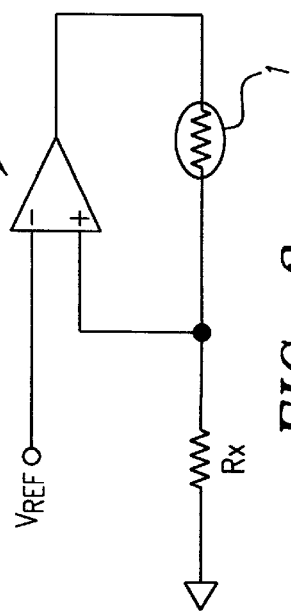
FIG. 3 is a functional outline of the low power circuit of a second preferred embodiment.

FIG. 3 is a functional outline of the low power low voltage semi constant power circuit of the alternate preferred embodiment. As is the case with the preferred embodiment shown in FIG. 1, this circuit utilizes a resistive thermal radiation source 1 which has an initial source resistance $R_{si}$. Once again, as an especially preferred embodiment, the resistive thermal radiation source 1 is an incandescent miniature light bulb. The source 1 is coupled to a constant power driver which is shown generally as 40. The output impedance of this constant power driver 40 relative to the lamp will be Rx*(GAIN+1). The maximum voltage required to operate the circuit will be the voltage across the almp plus the voltage across $R_x$. Thus, once $R_{si}$ is known, it is possible to calculate the output impedance that should be programmed for the constant power driver 40 which is coupled to the bulb 1 so that the power delivered to the bulb 1 will remain constant within a preselected deviation over a fixed period of time. For optimal results, the output impedance can be programmed by use of the equation $R_x$*(GAIN+1)= $R_0$ where $R_0$ can be calculated through use of EQUATION 1 above which was used to generate FIG. 2. $R_x$ is a preselected resistance typically between 1 to 5 ohms from which the GAIN can then be calculated to satisfy the equation. Once the equation is satisfied the output impedance of the constant power driver is within a chosen variation from the source resistance at its operating temperature so that the electrical power delivered to the resistive thermal radiation source of bulb 1 will remain constant within a preselected deviation over a fixed period of time as the source resistance varies +/-10% of its initial electrical resistance at its operating temperature. Thus, for purposes of illustration, assume in a typical case the $R_{lamp}$=37.5 Ohm at its operating temperature. In this example, we can achieve the desired result if we let Rx=2 ohms and set the GAIN to 17.75.

Figure 4:
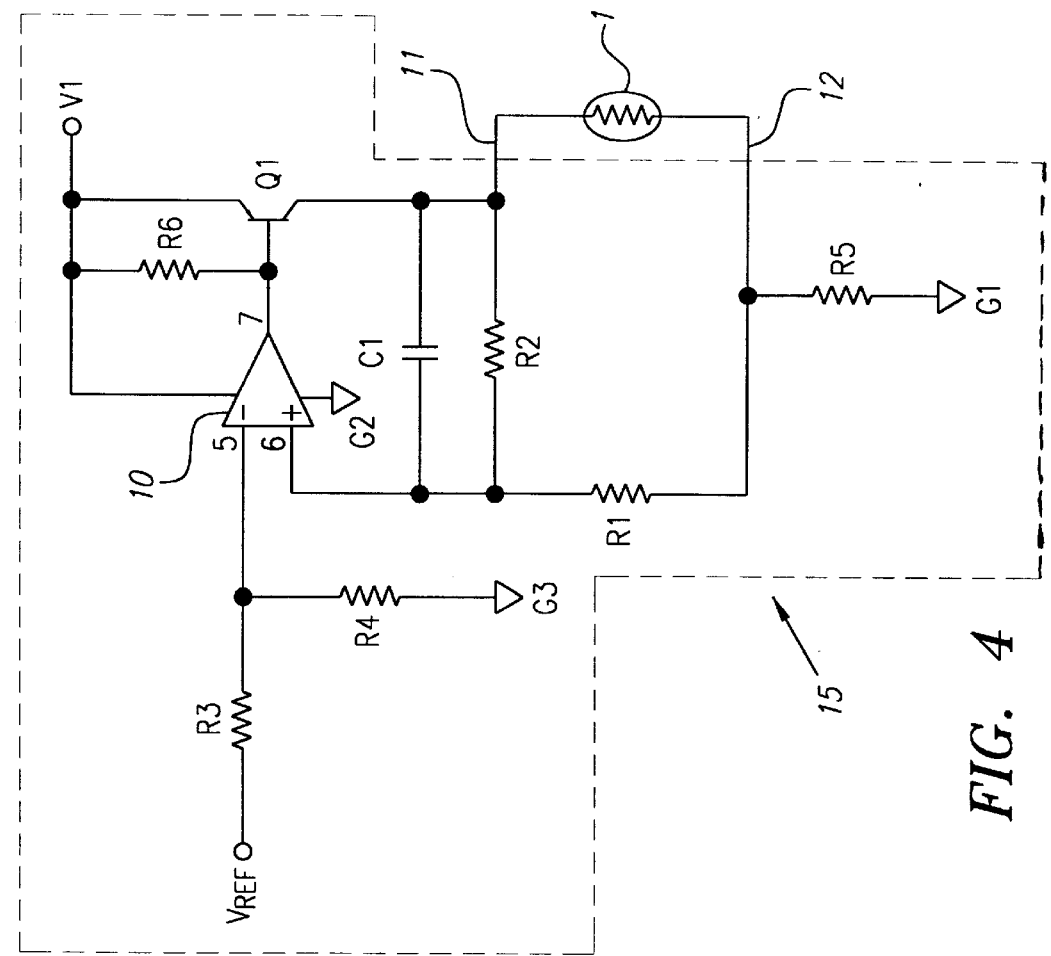
FIG. 4 is an implementation of a circuit of the second preferred embodiment.

To further illustrate the alternate preferred embodiment, FIG. 4 describes an implementation of a circuit of the second preferred embodiment useful as a lamp driver in an NDIR gas analyzer designed to detect carbon monoxide. The bulb 1 has a first end 11 and a second end 12. The bulb has an initial resistance at an operating temperature of 1000° C. of 50 Ohms. The constant power driver 15 has a voltage input $V_1$ of 4.5V and a voltage reference $V_{ref}$ set at 2.5V. The constant power driver 15 has six resistors, $R_1$–$R_6$, with resistance values of 27.4K Ohms, 1M Ohms, 45.3K Ohms, 3.92K Ohms, 1.33 Ohms, and 100K Ohms, respectively. The constant power driver 15 has four grounds, $G_1$–$G_3$. OpAmp 10 is a commercially available OpAmp sold under the designation TLC22552CD which has a gain of 36.5 in constant power driver 15. OpAmp 10 has a first input 5 coupled to voltage input Vref, a second input 6 coupled to resistor R1 and R2 which determine GAIN of amplifier and output 7 coupled to a transistor $Q_1$ which is commercially available and sold under the designation SST4403; therefore R5 equates to 1.33 Ohms.

Thus, in FIG. 4, the output impedence of the programmable impedence circuit, shown generally as 15, is selected so that the power delivered to the resistive thermal radiation source will remain constant within a preselected deviation of 0.1% over a fixed period of time which is designed to be no less than three years.

It will be readily apparent to those skilled in the art that still further changes and modification in the actual concepts described herein can readily be made without departing from the spirit and scope of the invention as defined by the following claims.

What is claimed is:

1. An improved power circuit, comprising:

a voltage source;

a resistive thermal radiation source with a source resistance at an operating temperature which is initially equal to an initial source resistance;

an element with a preselected resistance coupled between the voltage source and the resistive thermal radiation source; and a ground coupled to the thermal radiation source;

wherein the preselected resistance is selected to be within a chosen variation from the initial source resistance so that the power delivered to the resistive thermal radiation source will remain constant within a preselected deviation over a fixed period of time as the source resistance varies between the initial source resistance and a second source resistance at the operating temperature.

2. An improved power circuit as recited in claim 1, wherein the preselected resistance is selected according to the following equation:

$$\frac{\Delta P}{P_{si}} = \frac{(K_1^2 - K_2) \times (1 - K_2)}{(K_1 + K_2)^2}$$

wherein $\Delta P = P_{si} - P_s$; $P_{si}$=the initial power on the resistive thermal radiation source; $P_s$=the power on the resistive thermal radiation source when the source resistance is equal to the second source resistance; $K_1 = R_0/R_{si}$; $R_0$=the preselected resistance; $R_{si}$=the initial source resistance; $K_2 = R_s/R_{si}$; and $R_s$=the second source resistance.

3. An improved power circuit as recited in claim 1, wherein the second resistance is approximately equal to the initial source resistance.

4. An improved power circuit as recited in claim 3, wherein the resistive thermal radiation source is an incandescent bulb which is used as an infrared source in an NDIR gas analyzer.

5. An improved power circuit as recited in claim 1, wherein the second source resistance is within +/-10% of the initial source resistance.

6. An improved power circuit, comprising:
a constant power driver with a programmable output impedance; and
a resistive thermal radiation source coupled to the constant power driver, the resistive thermal radiation source having a source resistance at an operating temperature which is initially equal to an initial source resistance;
wherein the output impedance of the constant power driver is programmed by use of an element with a preselected resistance which is within a chosen variation from the initial source resistance so that the power delivered to the resistive thermal radiation source will remain constant within a preselected deviation over a fixed period of time as the source resistance varies between the initial source resistance and a second source resistance at the operating temperature.

7. An improved power circuit as recited in claim 6, wherein the programmable output impedance of the constant power driver is equal to $R_0$ which is determined according to the following equation:

$$\frac{\Delta P}{P_{si}} = \frac{(K_1^2 - K_2) \times (1 - K_2)}{(K_1 + K_2)^2}$$

wherein $\Delta P = P_{si} - P_s$; $P_{si}$=the initial power on the resistive thermal radiation source; $P_s$=the power on the resistive thermal radiation source when the source resistance is equal to the second source resistance; $K_1 = R_0/R_{si}$; $R_0$=the preselected resistance; $R_{si}$=the initial source resistance; $K_2 = R_s/R_{si}$; and $R_s$=the second source resistance.

8. An improved power circuit as recited in claim 6, wherein the resistive thermal radiation source emits infrared radiation for use in a gas detector.

9. An improved power circuit as recited in claim 8, wherein the gas detector is designed to detect the presence of carbon monoxide gas.

10. An improved power circuit as recited in claim 8, wherein the preselected deviation is within approximately 0.1% of the initial source resistance.

11. An improved power circuit as recited in claim 6, wherein the second resistance is approximately equal to the initial source resistance.

12. An improved power circuit as recited in claim 11, wherein the resistive thermal radiation source is an incandescent bulb which is used as an infrared source in an NDIR gas analyzer.

13. An improved power circuit as recited in claim 6, wherein the second resistance is within +/−10% of the initial source resistance.

14. An improved power circuit, comprising:
a resistive thermal radiation source with a source resistance at an operating temperature which is initially equal to an initial source resistance;
a voltage source; and
a programmable impedence circuit comprised of:
a ground;
an element with a preselected resistance coupled to the ground; and
an amplifier with a preselected gain with a first input coupled to the voltage source, a second input coupled to the element with the second resistance and a first end of the resistive thermal radiation source, and an output connected to a second end of the resistive thermal radiation source;
wherein the output impedence of the programmable impedence circuit is selected so that the power delivered to the resistive thermal radiation source will remain constant within a preselected deviation over a fixed period of time as the source resistance varies between the initial source resistance and a second source resistance at the operating temperature.

15. An improved power circuit as recited in claim 14, wherein the output impedance of the programmable impedence circuit is equal to $R_0$ which is determined according to the following equation:

$$\frac{\Delta P}{P_{si}} = \frac{(K_1^2 - K_2) \times (1 - K_2)}{(K_1 + K_2)^2}$$

wherein $\Delta P = P_{si} - P_s$; $P_{si}$=the initial power on the resistive thermal radiation source; $P_s$=the power on the resistive thermal radiation source when the source resistance is equal to the second source resistance; $K_1 = R_0/R_{si}$; $R_0$=the preselected resistance; $R_{si}$=the initial source resistance; $K_2 = R_s/R_{si}$; and $R_s$=the second source resistance.

16. An improved power circuit as recited in claim 15, wherein the second resistance is approximately equal to the initial source resistance.

17. An improved power circuit as recited in claim 16, wherein the resistive thermal radiation source is an incandescent bulb which is used as an infrared source in an NDIR gas analyzer.

18. An improved power circuit as recited in claim 15, wherein the second resistance is within +/−10% of the initial source resistance.

* * * * *